US006985845B1

(12) United States Patent
Pisarsky

(10) Patent No.: US 6,985,845 B1
(45) Date of Patent: Jan. 10, 2006

(54) SECURITY MONITOR OF SYSTEM RUNS SOFTWARE SIMULATOR IN PARALLEL

(75) Inventor: Vladimir R. Pisarsky, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 595 days.

(21) Appl. No.: 09/670,129

(22) Filed: Sep. 26, 2000

(51) Int. Cl.
```
G06F 11/30    (2006.01)
G06F 12/14    (2006.01)
G06F 13/10    (2006.01)
G06F 9/44     (2006.01)
H04L 9/00     (2006.01)
```
(52) U.S. Cl. ............................. 703/21; 703/2; 703/22; 713/200; 713/201
(58) Field of Classification Search ................. 703/25, 703/22, 2, 21; 713/201, 200
See application file for complete search history.

(56) References Cited

U.S. PATENT DOCUMENTS

| | | | | |
|---|---|---|---|---|
| 5,394,347 A * | 2/1995 | Kita et al. | ...................... | 703/2 |
| 5,414,833 A * | 5/1995 | Hershey et al. | ............. | 713/201 |
| 5,528,516 A * | 6/1996 | Yemini et al. | .............. | 702/181 |
| 5,661,668 A * | 8/1997 | Yemini et al. | .............. | 702/186 |
| 6,061,599 A | 5/2000 | Rhodehamel et al. | | |
| 6,249,755 B1 * | 6/2001 | Yemini et al. | ............. | 702/183 |
| 6,393,386 B1 * | 5/2002 | Zager et al. | .................. | 703/25 |
| 6,408,262 B1 * | 6/2002 | Leerberg et al. | ............... | 703/2 |
| 6,434,512 B1 * | 8/2002 | Discenzo | ..................... | 702/184 |
| 6,477,439 B1 * | 11/2002 | Bernaden et al. | ........... | 700/103 |
| 6,477,651 B1 * | 11/2002 | Teal | ........................... | 713/200 |
| 6,647,519 B1 * | 11/2003 | Lometti et al. | ............. | 714/715 |
| 6,654,882 B1 * | 11/2003 | Froutan et al. | ............. | 713/153 |
| 6,697,857 B1 * | 2/2004 | Dixon et al. | ................. | 709/224 |

OTHER PUBLICATIONS

Ilgun, K. et al. "State Transition Analysis: A Rule-Based Intrusion Detection Approach." IEEE Transaction on Software Engineering. Mar. 1995. vol. 21, Issue 3, pp. 181-199.*
Sekar, R. et al. "Synthesizing Fast Intrusion Prevention / Detection Systems from High-Level Specifications." Proc. of the 8th USENIX Security Symposium. Aug. 23-26, 1999.*
Forrest, S. et al. "Computer Immunology". Communications of the ACM. Oct. 1997. vol. 40, Issue 10, pp. 88-96.*
Ilugin, K. "USTAT: A Real-Time Intrusion Detection System for UNIX". Proc. IEEE Comp. Society Symposium on Research in Security and Privacy. May 1993. pp. 24-26.*

(Continued)

Primary Examiner—Paul L. Rodriguez
Assistant Examiner—Ayal Sharon
(74) Attorney, Agent, or Firm—Larry Liberchuk

(57) ABSTRACT

A monitoring system monitors a system that has multiple devices that perform respective primary tasks. For the purpose of the monitoring, each device has a finite state machine (FSM) with stochastic non-periodic behavior. The monitoring system simulates in software the behavior of the FSM's. A discrepancy between the states assumed by the FSM's after each time step and the states assumed in the simulation in each time step indicates a failure or a breach of the network's integrity. Hacking such as primary system is practically impossible without being detected. Each device comprises computational resources. In order to reduce the computational environment available to a virus, the idle time of the resources is absorbed by dynamically increasing the complexity of the FSM's.

5 Claims, 1 Drawing Sheet

OTHER PUBLICATIONS

Venkatesan, R.M. et al. "Threat-Adaptive Security Policy." IEEE IPCCC 1997. Feb. 1997. pp. 525-531.*

Lunt, T.F. et al. "IDES: A Progress Report." Proc. 6$^{th}$ Annual Comp. Security App. Conf. Dec. 1990. pp. 273-285.*

Lunt, T.F. "Real-Time Intrusion Detection." COMPCON Spring '89. Feb.-Mar. 1989. pp. 348-353.*

King, G. et al. "An Alternative Implementation of the Reference Monitor Concept." 4$^{th}$ Aerospace Computer Security Conference. Dec. 1988. pp. 159-166.*

Murthy, V.K. et al. "Knowledge-Based Key-Hole Monitoring of Users for Security Control in Transaction Processing Systems." Proc. IEEE Singapore Int'l Conf. on Networks. Sep. 1993. vol. 1, pp. 416-420.*

Bodorik, P. "Multi-View Memory to Support OS Locking for Transaction Systems." Proc. Int'l Database Engineering and Applications Symposium. (IDEAS '97). Aug. 1997. pp. 309-318.*

* cited by examiner $$X_k(t) = F_k(X_1(t-1), X_2(t-1), ..., X_M(t-1), S_k, X_k(t-2), X_k(t-3), X_k(t-4), ..., X_k(t-N))$$

SECURITY MONITOR OF SYSTEM RUNS SOFTWARE SIMULATOR IN PARALLEL

FIELD OF THE INVENTION

The invention relates to security measures against viruses and hackers attempting to attack an electronic system with distributed functionalities. The invention relates in particular, but not exclusively, to a home network environment.

BACKGROUND ART

Security of computer systems and networks is being challenged by hackers and by computer viruses.

The term "hacking" is colloquially being used to refer to attempting to gain unauthorized access to another party's computer system or network. Although not all hackers have malicious purposes, such security breaches can have serious consequences if it leads to stealing or corrupting electronic information or to crashing the system.

A virus is a piece of code that gets loaded onto the computer system and executed without the user knowing about it. A typical example of a virus is a program that replicates itself. A possible hazard of such a virus is that it quickly occupies all available memory, thus bringing the system to a halt. If the virus is capable of transmitting itself across networks and bypasses security systems it can spread the disaster.

SUMMARY OF THE INVENTION

With the advent of home networks and home gateways, security against hackers and viruses is also becoming a concern to consumers in a domestic environment. A home network couples apparatus in a control network and/or communication network. These networks often also provide Internet access and cover mobile users via wireless modems, thus exposing the home to unauthorized electronic access from outside.

The invention provides, among other things, a solution to this security problem. More particularly, the invention considers a distributed information processing system that comprises a cluster of interacting devices or appliances forming, e.g., a home network. The devices or appliances have finite state machines (FSM's) onboard for the purpose of monitoring the cluster's integrity. The system has a control server running a simulator of the cluster's FSM's. Each respective device's FSM calculates per time step a respective numerical value that depends on the values of the other devices' FSM's in the previous step, on the respective device's internal state (e.g., based on the device's memory's and I/O message buffers' content), and on a history of the previous values. This mathematical relationship is chosen such that it causes the collection of FSM's to behave as if they formed a dynamic non-periodic stochastic process. The simulator does the same on the server. The results of the simulator and the devices' FSM's should be identical. Upon a mismatch, an alert is generated. The security of the system resides in the facts that in order to be able to hack the system, the hacker needs to have a snapshot of the values of all FSM's at a certain step, to collect the values of the steps taken into account in the history, and to get into the internal states of each device. All these manipulations need to be performed in one time step, which makes it a complex computational task and practically impossible due to the distributed character of the system. An additional measure is to allocate computation time of the CPU per device for the full 100% to the calculation of the numerical value by maximizing the number of previous states taken into account. If there is a need for compute time, the number of previous states is reduced. A virus needs a processing environment to be active. By means of fully occupying the CPU, there will be no computational environment available to the virus to settle.

The invention can well be used in a home control network, wherein appliances have simple processors to generate the numerical value of the FSM's.

BRIEF DESCRIPTION OF THE DRAWING

The invention is explained below in further detail, by way of example and with reference to the accompanying drawing wherein.

DETAILED EMBODIMENTS

Figures 1, 2:
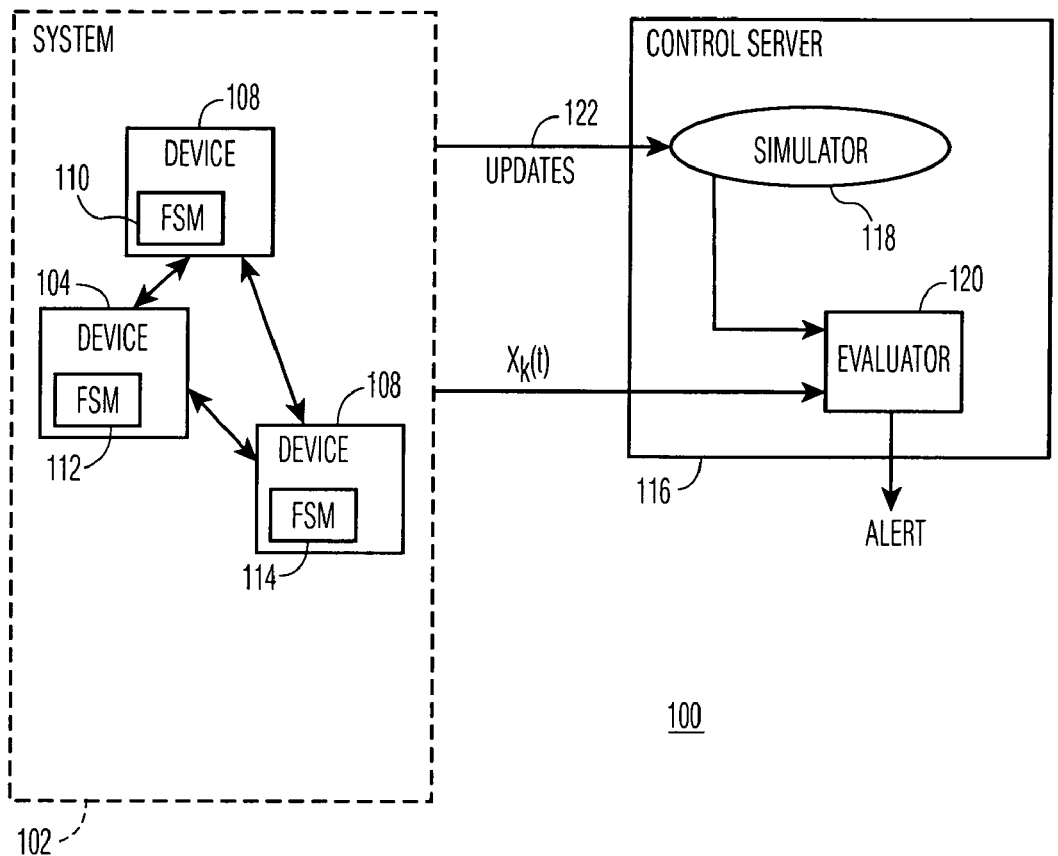
FIG. 1 is a block diagram with a monitoring system in the invention.
FIG. 2 is a mathematical expression representing an FSM.

In many different situations, there is a need to monitor the operation of a technical system to ensure integrity, security and correctness of the actions of the system. The type of system considered below is one that is implemented as a distributed network of devices. The devices have CPU-based controllers and are capable of exchanging information. The operation of the system is considered as the operation of a network of FSM's or extended finite state machines (EFSM's). An EFSM is an FSM with local constraints or local data variables. Examples of systems that can be modeled after FSM's are industrial automation and control systems, home networks, medical life support equipment, etc.

One of the problems that the invention seeks to solve is how to build a control and security system that issues an alarm in case of a failure, that may be caused by natural or malicious influences. Another problem addressed by the invention is how to block unsanctioned re-programming hacking and software virus infestation.

The inventor proposes several security layers that can be applied individually or combined in order to increase protection, robustness and security of the system. In the detailed discussion below the following definitions are being used:

SYSTEM: the conglomeration of the devices under consideration that needs to be monitored and defended;

DEVICE: a component of the SYSTEM that includes a CPU-based controller;

DEVICE STATE INFORMATION (DSI): control code calculated by some rules in the DEVICE's memory, possibly including the DEVICE's I/O message buffers;

CONTROL SERVER: computer outside the SYSTEM that is monitoring operations of the SYSTEM and that is capable of issuing the alarm;

SIMULATOR: simulation software simulating the SYSTEM as a distributed network of EFSM's.

FIG. 1 is a block diagram of a system 100 in the invention. System 100 comprises a SYSTEM 102, e.g., a home network. SYSTEM 102 includes DEVICES 104, 106, . . . , 108. Each of DEVICES 104–108 has a respective FSM 110, 112, . . . , 114. System 100 further comprises a CONTROL SERVER 116 that runs a SIMULATOR 118 simulating the behavior of SYSTEM 102 in software. The results of SIMULATOR 118 are compared with the states of DEVICES 104–108 in an evaluator 120 to issue an alert upon detection of a discrepancy.

In a first one of the security layers SIMULATOR 118 is run on CONTROL SERVER 116. For each discrete time step the CPU of each of DEVICES 104–108 calculates a respective DSI associated with the relevant DEVICE. This DSI is compared with a corresponding DSI code that is calculated for that DEVICE by SIMULATOR 118. A mismatch between these values is an indication of operational failure or of illegitimate reprogramming of SYSTEM 102.

FIG. 2 is a mathematical expression defining an FSM. A value $X_k(t)$ is calculated for each DEVICE (k) for each time step "t" according to this expression, wherein:

"t" is the current moment in time;

"k" is the index or label for DEVICE (k), running from 1 to M, assuming the number of DEVICES equals M (M equals 3 in the illustrated example);

"$S_k$" is the DSI of DEVICE (k); and

"$F_k(., ., .)$" is the "k"-th component of a mathematical vector function chosen such that the set of M equations describes a stochastic non-periodical dynamic process.

Accordingly, $X_k(t)$ for a fixed "k" depends on the values X of all DEVICES 104–108 taken at the previous time step, on the DSI of DEVICE (k), and on the history of the value X for DEVICE (k). The length of the history taken into account is determined by the number N. SIMULATOR 118 calculates these values $X_k(t)$ for all "k" in each time step using the same mathematical correspondence. Each time step the values $X_k(t)$ as calculated by DEVICES 104–108 are compared with the values $X_k(t)$ as calculated by SIMULATOR 118. A discrepancy is an indication that the integrity of SYSTEM 102 has been violated.

In order to reprogram any of DEVICES 104–108 or in order to issue some extra command directly and with effect on SYSTEM 102, a virus or a hacker has to penetrate all DEVICES 104–108 of SYSTEM 102 and has to collect the required history $X_k(t-1)$, $X_k(t-2)$, . . . , $X_k(t-N)$ for all DEVICES 104–108. Due to the stochastic nature of the evolution of the model given by the set of equations of FIG. 2, all these manipulations are to be performed during one time step. This makes undetected hacking of interfering with SYSTEM 102 technically and computationally a very complex task.

A computer virus needs a CPU resource from at least one of DEVICE 104–108 in order to perform its tasks, including the activities of hiding and mimicking. The inventor therefore proposes to reduce or eliminate CPU idling in order to prevent creating a suitable environment for the virus. This can be done, for example, as follows.

Initially, i.e., at t=0, SYSTEM 102 is loaded with equations as discussed under FIG. 2, so that it takes all extra CPU resources of each DEVICE beyond those needed for the primary tasks of the DEVICE. This can be one, for example, by increasing the computational complexity of the dynamic process by means of increasing the quantity N that determines the length of the history or recursion taken into account. If the DEVICE needs additional CPU power during operational use of SYSTEM 102, then the number N is decreased dynamically under control of an appropriate scheduling algorithm. These manipulations are performed on SYSTEM 102 as well as on CONTROL SERVER 116 so as to conserve the match between the calculated and operational values of the stochastic process. SIMULATOR 118 is therefore notified of these updates 122 to maintain this consistency.

CONTROL SERVER 116 can be a trusted well protected apparatus in the same geographic environment, e.g., the home, as SYSTEM 102. Alternatively, CONTROL SERVER 116 is a remote server of a trusted party.

In summary, the inventor proposes to simulate in software a primary system of multiple devices and to evaluate the behavior of the actual devices with respect to the simulations in order to detect legitimateness of the system's operations. The devices have FSM's. A stochastic discrete set of equations is used to cross-bind states and inter-device messages so as to make it impossible to predict and pre-calculate the primary system's control code values. As an anti-virus measure a computational environment is created that minimizes availability of computational resources to a virus. The latter can be implemented by usage of dynamically variable depth of recursion in the set of discrete equations as a mechanism to absorb idle computational resources.

What is claimed is:

1. A method of determining the integrity of a distributed information processing system including a plurality of networked devices, each device including a finite machine (FSM), the method comprising:

performing a primary task in each of the plurality of networked devices, the primary task having a computational requirement that varies over time;

performing a secondary task in each of the plurality of the networked devices, wherein performing the secondary task in a first one of the plurality of the networked devices includes generation, per time step, a respective numerical value that depends on a corresponding numerical value in each of the others of the plurality of networked devices at a previous time step;

receiving, at a control server, update information regarding the state of each of the plurality of networked devices;

simulating, in the control server, the secondary task of each of the plurality of the networked devices, wherein simulating the secondary task in the control server includes generating, per time step, numerical values for each of the simulated tasks, based at least upon the received update information;

receiving, at the control server, the numerical values generated by the plurality of the networked devices;

determining by the control server whether the received numerical values are equal to the simulated values; and generating an alert if it is determined that the received numerical values are not equal to the simulated values;

wherein generating the numerical value, per time step, in each of the networked devices, further depends on a history of previous numerical values of the device performing the secondary task, the history has a length, and the length is dynamically modified in inverse relation to the computations requirements of the primary task.

2. The method of claim 1, wherein generating the numerical value further depends on an internal state of the device performing the secondary task.

3. The method of claim 2, wherein the internal state includes a memory content, and an I/O buffer content of the device performing the secondary task.

4. The method of claim 3, wherein the secondary task is chosen such that the performance of the secondary tasks by networked devices results in the behaviour of a dynamic non-periodic stochastic process.

5. The method of claim 4, wherein the control server is geographically remote from the networked devices.

\* \* \* \* \*